United States Patent
Park et al.

(10) Patent No.: US 9,006,946 B2
(45) Date of Patent: Apr. 14, 2015

(54) MOTOR STRUCTURE AND FLAT TYPE VIBRATION MOTOR STRUCTURE USING THE SAME

(75) Inventors: Kyung Su Park, Gyunggi-do (KR); Dong Su Moon, Gyunggi-do (KR); Yong Tae Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 201 days.

(21) Appl. No.: 13/591,088

(22) Filed: Aug. 21, 2012

(65) Prior Publication Data

US 2014/0001899 A1   Jan. 2, 2014

(30) Foreign Application Priority Data

Jun. 29, 2012   (KR) ........................ 10-2012-0070818

(51) Int. Cl.
*H02K 7/08* (2006.01)
*H02K 7/075* (2006.01)
*H02K 5/16* (2006.01)
*H02K 7/06* (2006.01)

(52) U.S. Cl.
CPC .... *H02K 7/075* (2013.01); *H02K 5/16* (2013.01); *H02K 7/063* (2013.01)

(58) Field of Classification Search
CPC ......... H02K 5/16; H02K 7/075; H02K 7/063; B06B 1/04
USPC ..................................................... 310/90, 81
See application file for complete search history.

(56) References Cited

U.S. PATENT DOCUMENTS

| | | | | |
|---|---|---|---|---|
| 2,740,955 | A * | 4/1956 | Barrett .................... | 340/815.87 |
| 3,617,653 | A * | 11/1971 | Tibbetts et al. ................ | 310/36 |
| 4,146,289 | A * | 3/1979 | Kirrish .......................... | 439/431 |
| 6,051,900 | A * | 4/2000 | Yamaguchi ..................... | 310/81 |
| 6,193,566 | B1 * | 2/2001 | Isobe et al. ................... | 439/801 |
| 6,593,675 | B2 * | 7/2003 | Lee ................................ | 310/91 |
| RE38,347 | E * | 12/2003 | Yamaguchi ..................... | 310/81 |
| 6,685,395 | B1 * | 2/2004 | Busby ........................... | 405/215 |
| 7,604,444 | B2 * | 10/2009 | Wu ................................ | 411/85 |
| 2002/0174619 | A1 * | 11/2002 | Hanna ............................ | 52/574 |
| 2003/0015929 | A1 * | 1/2003 | Lee ................................ | 310/81 |
| 2005/0140222 | A1 * | 6/2005 | Sohara ........................... | 310/81 |
| 2009/0267434 | A1 * | 10/2009 | Park ............................... | 310/81 |
| 2010/0270878 | A1 * | 10/2010 | Park ............................... | 310/71 |
| 2011/0193429 | A1 * | 8/2011 | Lee ................................ | 310/43 |

FOREIGN PATENT DOCUMENTS

| KR | 10-2006-0050842 | 5/2006 |
| KR | 1020080033702 | 4/2008 |
| KR | 10-0901117 | 6/2009 |

OTHER PUBLICATIONS

Office action dated Jul. 18, 2013 from corresponding Korean Patent Application No. 10-2012-0070818 and its English summary provided by the clients.

* cited by examiner

*Primary Examiner* — Alex W Mok
(74) *Attorney, Agent, or Firm* — Ladas & Parry, LLP

(57) ABSTRACT

Disclosed herein is a motor structure with reduced rotation resistance of a bearing. The motor structure according to the preferred embodiment of the present invention includes: a fixing body, a shaft fixed to the fixing body, a bearing rotatably fitted on the shaft, a rotating body fixed to an outer side of the bearing and rotated by electromagnetic force, a case fixed to the fixing body and having the shaft, the bearing, and the rotating body accommodated in an inner space thereof, and a washer fixed to a top inside of the case so as to be interposed between the top inside of the case and a top surface of the bearing and contacting a part of the top area of the bearing.

12 Claims, 3 Drawing Sheets

MOTOR STRUCTURE AND FLAT TYPE VIBRATION MOTOR STRUCTURE USING THE SAME

CROSS REFERENCE TO RELATED APPLICATION

This application claims the benefit of Korean Patent Application No. 10-2012-0070818, filed on Jun. 29, 2012, entitled "Motor Structure and Flat Type Vibration Motor Structure Using the Same," which is hereby incorporated by reference in its entirety into this application.

BACKGROUND OF THE INVENTION

1. Technical Field

The present invention relates to a motor structure and a flat type vibration motor structure using the same.

2. Description of the Related Art

In portable electronic devices such as mobile phones, game machines, personal digital assistants (PDAs), and the like, various types of vibration generation devices are mounted in portable electronic devices so as to prevent external acoustic from being damaged to others.

In particular, the vibration generation device, which is mounted in a mobile phone, has been used as a silent terminating signal generation device. Recently, as a mobile telephone is miniaturized and slimmed, a demand for a small and multi-functional vibration generation device mounted therein has increased.

The vibration generation device has used various types of vibration motors as a vibration source, wherein the vibration motor is classified into a flat type and a cylinder type according to a shape thereof and is classified into a brush type and a brushless type according to presence or absence of a brush.

Among others, the brush type flat type vibration motor can be manufactured to have a thin thickness and thus, is suitable to miniaturize a mobile phone. Therefore, the brush type flat type vibration motor has been widely used today.

Korean Patent Laid-Open Publication No. 10-2008-0033702 discloses a brush type flat type vibration motor according to the prior art.

The flat type vibration motor disclosed in the Korean Patent Laid-Open Publication No. 10-2008-0033702 is configured to include a bracket to which a lower substrate is fixed, a case covering a top portion of the bracket and partitioning an inner space, a shaft supported by the bracket, a magnet that is a stator mounted at a top edge of the bracket, and an eccentric rotor rotatably mounted at the shaft.

In this configuration, the rotor is configured to include an upper substrate having a commutator formed on a bottom surface thereof, bearings rotatably supported to the shaft, a coil and a weight body each mounted on a top surface of the upper substrate, and a molding member integrally connecting the upper substrate, the coil, and the weight body with one another.

In addition, one side of the brush is soldered to the lower substrate and the other side of the brush is soldered to the commutator, such that power from the outside is supplied to the coil.

The brush type vibration motor adopting the structure generates vibrations while the rotor rotates by electromagnetic force formed between the coil and the magnet, when the power from the outside is supplied to the coil through the lower substrate→the brush→the commutator.

Meanwhile, the flat type vibration motor according to the prior art generally has a structure in which a washer is interposed between top surfaces of the bearings and an inside of the case so that the top surfaces of the bearings do not contact the inside of the case during the rotation of the bearings.

When the washer is not interposed between the top surfaces of the bearings and the inside of the case, the bearings rotate while contacting the inside of the case. In this case, components may be worn out, noise may occur, and the like.

In order to prevent the problems, the washer is interposed between the top surfaces of the bearings and the inside of the case.

The washer generally has a disk shape. In this case, an outer diameter of the washer is larger than that of the bearing. Therefore, the top surfaces of the bearings entirely contact a bottom surface of the washer.

In the flat type vibration motor according to the prior art, the washer has a disk shape and therefore, a contact area between the washer and the bearing is bound to be widely formed. Therefore, rotation resistance is largely generated at the time of rotating the bearings and thus, power consumption may be increased and revolutions per minute (rpm) of the rotor may be reduced.

SUMMARY OF THE INVENTION

The present invention has been made in an effort to provide a motor structure capable of reducing rotation resistance of a bearing by reducing a contact area between a bearing and a washer, and a flat type vibration motor structure using the same.

According to a preferred embodiment of the present invention, there is provided a motor structure, including: a fixing body; a shaft fixed to the fixing body; bearings rotatably fitted on the shaft; a rotating body fixed to outsides of the bearings and rotated by electromagnetic force; a case fixed to the fixing body and having the shaft, the bearings, and the rotating body accommodated in an inner space thereof; and a washer fixed to a top inside of the case so as to be interposed between the top inside of the case and top surfaces of the bearings and contacting a part of the top areas of the bearings.

The washer may be formed in a bar shape of which the length is longer than an outer diameter of the bearing and the width is smaller than the outer diameter of the bearing.

The washer may be disposed to traverse the top surfaces of the bearings in a diameter direction of the bearing.

A top inside of the case may be provided with annular protrusions that are protruded toward the top surfaces of the bearings.

Top edges of the bearings may be provided with taper surfaces.

The washer may be bonded to the top inside of the case.

The washer may be formed of a PET material.

According to another preferred embodiment of the present invention, there is provided a flat type vibration motor structure, including: a bracket having a lower substrate and magnets attached to a top surface thereof; a shaft fixed to a central portion of the bracket; bearings rotatably fitted on the shaft; an upper substrate having a commutator mounted on a bottom surface thereof; winding coils and a weight body attached to a top surface of the upper substrate; a resin material formed on the upper substrate and fixed to the bearings; a brush of which one end is fixed to the lower substrate and the other end contacts the commutator; a case fixed to the bracket while covering the top of the bracket; and a washer fixed to a top inside of the case so as to be interposed between the top inside of the case and top surfaces of the bearings and contacting a part of top areas of the bearings.

The washer may be formed in a bar shape of which the length is longer than an outer diameter of the bearing and the width is smaller than the outer diameter of the bearing.

The washer may be disposed to traverse the top surfaces of the bearings in a diameter direction of the bearing.

A top inside of the case may be provided with annular protrusions that are protruded toward the top surfaces of the bearings.

Top edges of the bearings may be provided with taper surfaces.

The washer may be bonded to the top inside of the case.

The washer may be formed of a PET material.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
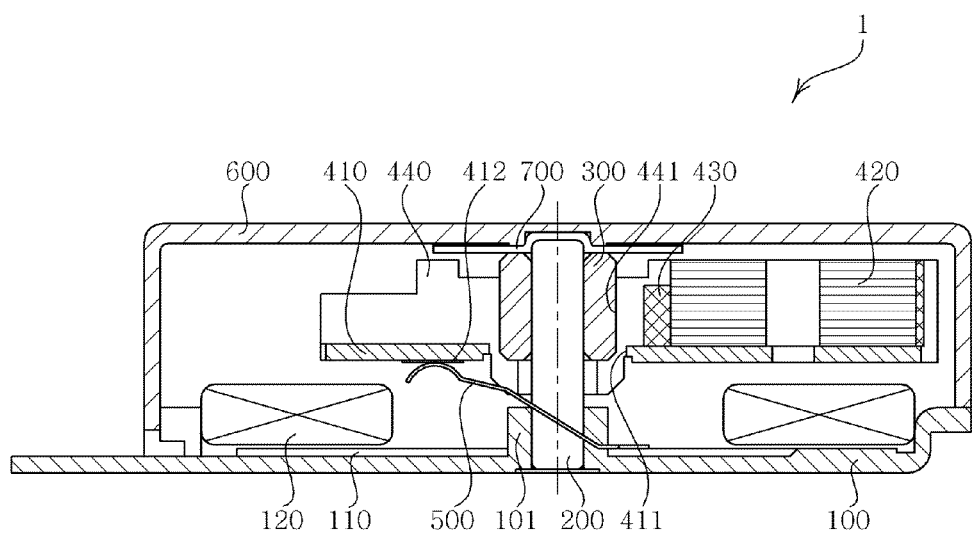
FIG. 1 is a cross-sectional view showing a flat type vibration motor structure according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
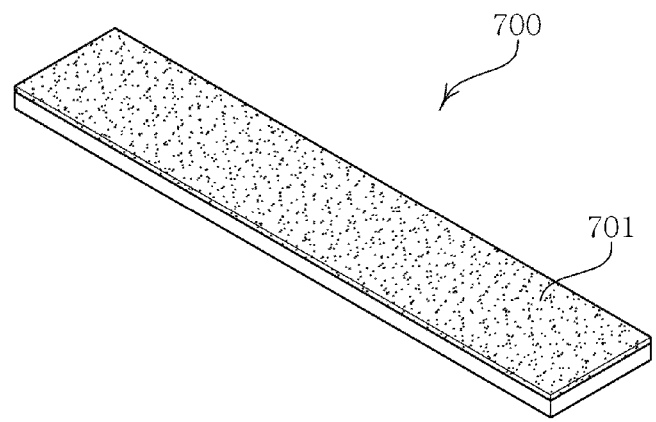
FIG. 2 is a perspective view of a washer shown in FIG. 1.
Figure 3:
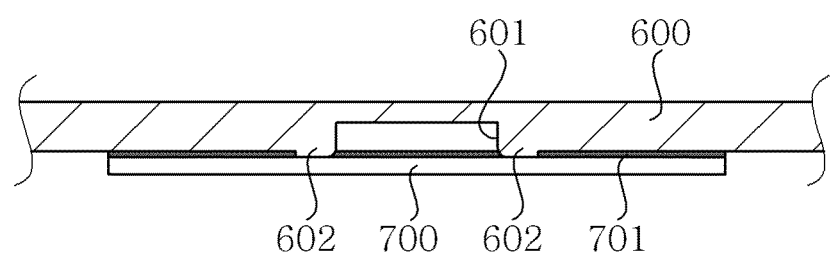
FIG. 3 is a partially enlarged cross-sectional view showing a fixing structure of a washer shown in FIG. 1.
Figure 4:
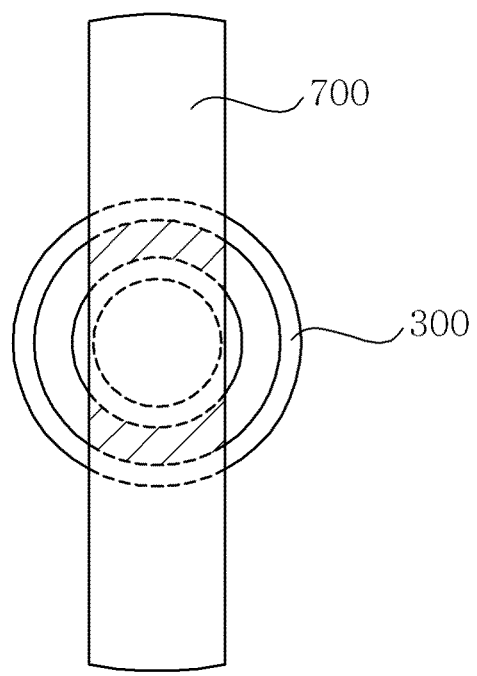
FIG. 4 is a plan view of a washer and a bearing showing a mutual contact area between the washer and the bearing shown in FIG. 1.
Figure 5:
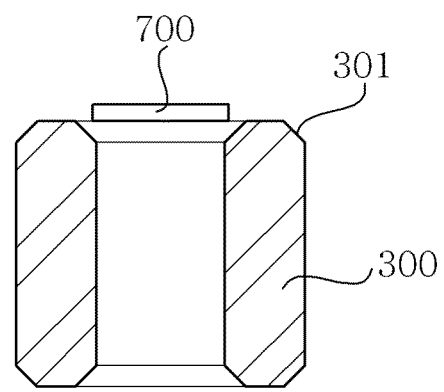
FIG. 5 is a front view of the washer and the bearing shown in FIG. 4.

FIG. 1 is a cross-sectional view showing a flat type vibration motor structure according to a preferred embodiment of the present invention, FIG. 2 is a perspective view of a washer shown in FIG. 1, and FIG. 3 is a partially enlarged cross-sectional view showing a fixing structure of a washer shown in FIG. 1. FIG. 4 is a plan view of a washer and a bearing showing a mutual contact area between the washer and the bearing shown in FIG. 1 and FIG. 5 is a front view of the washer and the bearing shown in FIG. 4.

A motor structure according to the preferred embodiment of the present invention includes: a fixing body, a shaft fixed to the fixing body, bearings rotatably fitted on the shaft, a rotating body fixed to outsides of the bearings and rotated by electromagnetic force, a case fixed to the fixing body and having the shaft, the bearings, and the rotating body accommodated in an inner space thereof, and a washer fixed to a top inside of the case so as to be interposed between the top inside of the case and top surfaces of the bearings and contacting a part of the top areas of the bearings.

An example of the motor structure according to the preferred embodiment of the present invention will be described in more detail. A detailed example of the motor to which the motor structure according to the preferred embodiment of the present invention may be applied may include a flat type vibration motor. For example, a case in which the preferred embodiment of the present invention is applied to the flat type vibration motor will be described below in detail.

As shown in FIG. 1, a flat type vibration motor structure 1 to which the motor structure according to the preferred embodiment of the present invention may be applied may include: a bracket 100 having a lower substrate 110 and magnets 120 attached thereto; a shaft 200 fixed to a central portion of the bracket 100; bearings 300 rotatably fitted on the shaft 200; an upper substrate 410 having a commutator 412 mounted on a bottom surface thereof; winding coils 420 and a weight body 430 attached to a top surface of the upper substrate 410; a resin material 440 formed on the top surface of the upper substrate 410 and fixed to the bearings 300; a brush 500 of which one end is fixed to the lower substrate 110 and the other end contacts the commutator 412; a case 600 fixed to the bracket 100 while covering the top of the bracket 100, and a washer 700 fixed to a top inside of the case 600 so as to be interposed between the top inside of the case 600 and top surfaces of the bearings 300 and contacting a part of top areas of the bearings 300.

In this configuration, the bracket 100 corresponds to the fixing body of the motor structure according to the preferred embodiment of the present invention and the upper substrate 410, the resin material 440, the winding coils 420, and the weight body 430 correspond to the rotating body of the motor structure according to the preferred embodiment of the present invention.

In addition, the bearings 300, the case 600, and the washer 700 according to the flat type vibration motor structure 1 each correspond to the bearings, the case, and the washer included in the to motor structure according to the preferred embodiment of the present invention.

The bracket 100 supports the components of the vibration motor structure 1 and is assembled with the case 600 to provide the predetermined inner space. The bracket 100 may have a disk shape having a predetermined thickness and the shaft 200 is shaft-fixed to a central portion thereof. In addition, the bracket 100 has the lower substrate 110 and the magnets 120 attached to the top surface thereof.

Here, the central portion of the bracket 100 may be provided with a burring part 101 upwardly protruded so as to fix the shaft 200. The burring part 101 is press-fitted with one side of the shaft 200 so as to stand the shaft 200 vertically.

The lower substrate 110 includes a terminal part connected with an external power supply for supplying power. The lower substrate 110 is attached to the top surface of the bracket 100. In this case, the lower substrate 110 is soldered with one side of the brush 500 to be described below.

Meanwhile, FIG. 1 shows that the lower substrate 110 is separately formed from the bracket 100, but the lower substrate 110 and the bracket 100 can be integrally formed of the same material.

The magnet 120 generates a magnetic field having a predetermined strength. In addition, the winding coil 420 generates electromagnetic force according to current applied thereto. The electromagnetic force generated from the winding coil 420 interacts with the magnetic force of the magnet 120. In this case, the rotating body rotates by the interaction.

The magnets 120 may be bonded to the top of the lower substrate 110 by a bonding material, and the like. The magnets 120 may be disposed in an annular shape based on the shaft 200 vertically fixed to the bracket 100. In addition, the magnet 120 may be configured of a permanent magnet having a plurality of magnetic poles in which an N pole and an S pole are alternately magnetized along a circumferential direction. In this case, the magnets 120 are attached to face the winding coils 420 to be described below.

The case 600 is fixed to the bracket 100 while covering the top of the bracket 100. The case 600 has a space formed therein, which accommodates the shaft 200, the bearings 300, and components of the vibration motor structure 1 including the rotating body. Therefore, several components of the vibration motor structure 1 may be protected by the case 600.

The case 600 has considerable permeability so as to form a magnetic path of flux generated from the magnets 120 and the winding coils 420 and may be formed of a magnetic material having large strength so as to prevent the rotating body from being confined by a deformation due to external force.

In this case, the inner center of the case 600 directly contacts the rotating body to generate friction and noise and thus, may be provided with a friction reduction member (not shown) capable of reducing the friction and noise.

Meanwhile, the preferred embodiment of the present invention describes that the bracket 100 has a disk structure and the case 600 is fixed to the bracket 100 while covering the top of the bracket 100, which is only an example. It is apparent that the bracket 100 and the case 600 may be adopted to have any structure that provides an inner space in which the components of vibration motor structure 1 are accommodated and a rotation space in which the rotating body may rotate.

The rotating body is fixed to the outsides of the bearings 300 to be described below and may rotate by the action of the electromagnetic force. The flat type vibration motor structure 1 is an example of the rotating body and may be configured to include, for example, the upper substrate 410, the resin material 440, the winding coils 420, and the weight body 430. In addition, the rotating body of the above example generates vibrations while eccentrically rotating in the flat type vibration motor structure 1.

The upper substrate 410 supplies power to the winding coils 420 while supporting other components of the rotating body. The upper substrate 410 may have a semi-circular plate shape formed so as to be eccentric by cutting a part thereof. Further, the central portion of the upper substrate 410 is provided with a through hole 411 into which the shaft 200 and the bearings 300 are inserted.

Here, the bottom surface of the upper substrate 410 is formed so that the commutator 412 segmented into a plurality of segments on the bottom surface thereof is formed in an annular shape based on the through hole 411. The commutator 412 contacts the brush 500 to be described below to serve to supply power the winding coils 420. The commutator 412 may be formed by methods, such as pattern printing, plating, and the like.

The resin material 440, which is fixed to the bearings so that the rotating body may be fixed to the outsides of the bearings 300, may be provided with a groove part 441 to which the bearings 300 are fixed.

In this case, the resin material 440 may also be formed on the entire area of the upper substrate 410 and may also be formed around an area on which the bearings 300 are fitted as maximally as possible so as to have the bearing fixing groove part 441. The resin material 440 is extendibly formed to one end of the upper substrate 410 so as to be firmly fixed on the upper substrate 410 and thus, may also be formed to enclose a side of the upper substrate 410.

In this case, the bearings 300 are formed to have a predetermined height so as to be stably supported to the shaft 200 and the resin material 440 fixed to the bearings 300 may also be formed at a predetermined height or more correspondingly. As shown, the resin material 440 formed around the bearing fixing groove part 441 may be protruded downward from the upper substrate 410 by penetrating through the through hole 411 of the upper substrate 410 while being formed on the upper substrate 410 at a predetermined height or more so as to cover a height of the bearing 300.

Here, the resin material 440 is injected together with the upper substrate 410 or is separately injected therefrom and thus, may be press-fitted in the upper substrate 410.

When current is applied to the winding coils 420, the winding coils 420 generate a magnetic field having a predetermined strength. The winding coils 420 may be applied with current through the commutator 412 that contacts the brush 500. The magnetic field generated from the winding coils 420 interacts with the magnetic field generated from the magnets 120 and the rotating body rotates by the interaction.

Here, at least one winding coils 420 may be bonded to the top surface of the upper substrate 410 by a bond or a double-sided tape.

The weight body 430 is to add a predetermined mass so that the rotating body may eccentrically rotate. At least one weight body 430 may be bonded to the top surface of the upper substrate 410 by a bond or a double-sided tape. In addition, the weight body 430 may be formed of metals having high specific gravity such as tungsten, and the like.

The bearings 300 are rotatably supported to the shaft 200. In addition, the bearings 300 are inserted into the bearing fixing groove part 441 of the resin material 440, such that the bearings 300 are fixed to the resin material 440. In this case, the bearings 300 may be fixed to the bearing fixing groove part 441 in a press-fit manner, a bond, and the like.

As shown in FIG. 5, in order to further reduce a contact area between the bearings 300 and the washer 700 to be described below, a taper surface 301 may be formed at edges of the top surfaces of the bearings 300.

The brush 500 is to supply power to the commutator 412 and one end thereof is fixed to the top surface of the lower substrate 110 and the other end thereof elastically contacts the commutator 412 that is formed on the bottom surface of the upper substrate 410.

In this case, the lower substrate 110 is connected to a power supply unit (not shown) so as to supply power to the brush 500. The power supply unit is configured of a positive terminal and a negative terminal (not shown) in which a positive (+) current and a negative (−) current each flow, so as to supply current having different polarities to the segments of the commutator 412 through a pair of the brushes 500.

Meanwhile, the top inside of the case 600 faces the top surfaces of the bearings 300. In this case, when the top inside of the case 600 directly contacts the top surfaces of the bearings 300, the rotation resistance is increased at the time of rotating the bearings 300 and at the same time, the noise occurs.

Therefore, the washer 700 may be interposed between the top inside of the case 600 and the top surfaces of the bearings 300.

However, the washer provided in the flat type vibration motor according to the prior art has a disk shape and thus, the contact area between the washer and the top surfaces of the bearings is widely formed and the friction area between the washer and the bearings is widely formed, such that the rotation resistance has a big problem at the time of rotating the bearings.

In order to overcome the problem, the bottom surface of the washer 700 according to the preferred embodiment of the present invention entirely contacts the top surfaces of the bearings 300 and contacts only a part of the top areas of the bearings 300. In addition, the washer 700 may be formed in various shapes, like contacting only a part of the top areas of the bearings 300.

FIG. 2 shows an example of a detailed shape of the washer 700. Here, an example in which the washer 700 is generally formed in a bar shape is shown. In more detail, the washer 700 is concentrated on the bearings 300 in a diameter direction of the bearings 300 and thus, may have a longer length than an outer diameter of the bearings 300 so as not to contact the bearings 300 and have a smaller width than the outer diameter of the bearings 300 so as to reduce the contact area with the bearings 300.

As shown in FIGS. 4 and 5, the washer 700 having the above shape may be disposed to traverse the top surfaces of the bearings 300 in the diameter direction of the bearings 300.

The washer 700 is fixed to the top inside of the case 600. As a detailed example of the fixing structure, an example in which the washer 700 is bonded to the inside of the case 600 may be shown. In more detail, as shown in FIG. 2, the top surface of the washer 700 is provided with an adhesive layer 701 and thus, as shown in FIG. 3, the washer 700 may be bonded to the top inside of the case 600.

In addition, the washer 700 may be formed of a PET material so as to minimize the friction and noise occurrence at the time of rotating the bearings 300. The washer 700 formed of the PET material may be elastically bent somewhat.

Meanwhile, as shown in FIG. 1, the shaft 200 may be protruded upward from the top surfaces of the bearings 300. In this case, the top inside of the case 600 may be provided with a groove part 601 (see FIG. 3) into which a top end of the shaft 200 may be inserted. As the case in which the washer 700 is formed of the PET material and is disposed to traverse the top surfaces of the bearings 300 in the diameter direction of the bearings 300, as described above, the case in which the shaft 200 is protruded on the top surfaces of the bearings 300 allows the top end of the shaft 200 to press the central part of the washer 700. In this case, as shown in FIG. 1, the washer 700 may be inserted into the groove part 601 while the central part thereof being bent. In the case in which the washer 700 is inserted into the groove part 601 while the central part thereof being bent, the washer 700 may maintain a state in which the washer 700 may be firmly fixed in the top inside of the case 600, by adhesion of the adhesive layer 701 and mutual adhesion between the central part of the washer 700 and the inside of the groove part 601.

Meanwhile, as shown in FIG. 3, the case 600 may be provided with annular protrusions 602 protruded toward the top surfaces of the bearings 300 in an area in which the top surfaces of the bearings 300 face each other while being formed around the groove part 601 of the top inside thereof. The annular protrusions 602 slightly increases the adhesion between the top surface of the bearing 300 and the bottom surface of the washer 700 and thus, the bearings 300 rotate stably contacting the washer 700 at the time of rotating the bearings 300.

As described above, the motor structure according to the preferred embodiment of the present invention may reduce the contact area between the washer 700 and the bearing 300 to reduce the rotation resistance at the time of the bearing 300. Therefore, current required to drive the motor can be reduced or the rpm of the rotating body can be increased.

In order to confirm the above-mentioned advantages of the motor structure according to the preferred embodiment of the present invention, the measuring experiments of an RPM and a current value for the above-mentioned flat type vibration motor structure 1 to which the preferred embodiment of the present invention is applied in detail was conducted. The experiment results thereof are as follows.

| Motor | Measuring Frequency | Bar Type Washer | | Disk Type Washer | | Variation | |
|---|---|---|---|---|---|---|---|
| | | rpm | Current | rpm | Current | rpm | Current |
| A | 1 | 12248 | 65.7 | 12222 | 64.6 | 0.21% | 1.67% |
| | 2 | 12393 | 65.3 | 12176 | 64.9 | 1.75% | 0.61% |
| | 3 | 12650 | 65.2 | 12186 | 65.1 | 3.67% | 0.15% |
| | 4 | 12611 | 65.4 | 12214 | 65.3 | 3.15% | 0.15% |
| | 5 | 12531 | 65.1 | 12245 | 65.1 | 2.28% | 0.00% |
| | Average | 12487 | 65.3 | 12209 | 65.0 | 2.23% | 0.52% |
| B | 1 | 12577 | 65.1 | 11336 | 66.8 | 9.87% | −2.61% |
| | 2 | 12600 | 64.6 | 11277 | 66.7 | 10.50% | −3.25% |
| | 3 | 11420 | 66.2 | 11249 | 66.7 | 1.50% | −0.76% |
| | 4 | 11363 | 66.5 | 11513 | 66.0 | −1.32% | 0.75% |
| | 5 | 11357 | 66.1 | 11534 | 65.6 | −1.56% | 0.76% |
| | Average | 11863 | 65.7 | 11382 | 66.4 | 4.06% | −1.00% |
| C | 1 | 11597 | 66.5 | 11532 | 71.4 | 0.56% | −7.37% |
| | 2 | 11647 | 65.7 | 11567 | 72.8 | 0.69% | −10.81% |
| | 3 | 11658 | 65.6 | 11542 | 72.5 | 1.00% | −10.52% |
| | 4 | 11696 | 65.5 | 11523 | 73.2 | 1.48% | −11.76% |
| | 5 | 11522 | 71.4 | 11555 | 74.1 | −0.29% | −3.78% |
| | Average | 11624 | 66.9 | 11544 | 72.8 | 0.69% | −8.75% |
| D | 1 | 14240 | 65.2 | 13647 | 66.3 | 4.16% | −1.69% |
| | 2 | 14299 | 65.1 | 13777 | 66.5 | 3.65% | −2.15% |
| | 3 | 14249 | 64.6 | 13925 | 65.4 | 2.27% | −1.24% |
| | 4 | 14200 | 64.6 | 13926 | 65.4 | 1.93% | −1.24% |
| | 5 | 14274 | 64.4 | 14181 | 64.8 | 0.65% | −0.62% |
| | Average | 14252 | 64.8 | 13891 | 65.7 | 2.53% | −1.39% |

<Experimental Data Obtained by Measuring and Comparing RPM and Current>

The experimental data were obtained by measuring and comparing the RPM and the current value between the flat type vibration motor to which the motor structure of the preferred embodiment of the present invention including the bar type washer 700 is applied and the flat type vibration motor according to the prior art using the disk washer. Further, the experiment for the same kind of four vibration motors A, B, C, and D was conducted.

The vibration motor to which the bar type washer 700 included in the preferred embodiment of the present invention is applied shows that the RPM was further increased 2.23% as compared with the vibration motor according to the prior art, in the case of A in which the current value similar to the vibration motor according to the prior art was measured Further, even in the case of B and D in which current smaller than that of the vibration motor according to the prior art was measured, the RPM was further increased 4.06% and 2.53%, as compared with the vibration motor according to the prior art. Further, in the case of C in which the RPM similar to the vibration motor according to the prior art was measured, the current value was further reduced 8.75% as compared with the vibration motor according to the prior art.

As could be appreciated from the experimental data, the motor structure according to the preferred embodiment of the present invention has advantages in that the current required to drive the motor is reduced or the RPM is increased.

According to the present invention, it is possible to reduce the rotation resistance at the time of rotating the bearings with the reduced contact area between the washer and the bearing. Therefore, current required to drive the motor can be reduced or the rpm of the rotating body can be increased.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A motor structure, comprising:
a fixing body;
a shaft fixed to the fixing body;
bearings rotatably fitted on the shaft;
a rotating body fixed to outsides of the bearings and rotated by electromagnetic force;
a case fixed to the fixing body and having the shaft, the bearings, and the rotating body accommodated in an inner space thereof; and
a washer fixed to a top inside of the case so as to be interposed between the top inside of the case and top surfaces of the bearings and contacting a part of the top areas of the bearings,
wherein the washer is formed in a bar shape of which the length is longer than an outer diameter of the bearing and the width is smaller than the outer diameter of the bearing.

2. The motor structure as set forth in claim 1, wherein the washer is disposed to traverse the top surfaces of the bearings in a diameter direction of the bearing.

3. The motor structure as set forth in claim 2, wherein a top inside of the case is provided with annular protrusions that are protruded toward the top surfaces of the bearings.

4. The motor structure as set forth in claim 2, wherein top edges of the bearings are provided with taper surfaces.

5. The motor structure as set forth in claim 1, wherein the washer is bonded to the top inside of the case.

6. The motor structure as set forth in claim 1, wherein the washer is formed of a PET material.

7. A flat type vibration motor structure, comprising:
a bracket having a lower substrate and magnets attached to a top surface thereof;
a shaft fixed to a central portion of the bracket;
bearings rotatably fitted on the shaft;
an upper substrate having a commutator mounted on a bottom surface thereof;
winding coils and a weight body attached to a top surface of the upper substrate;
a resin material formed on the upper substrate and fixed to the bearings;
a brush of which one end is fixed to the lower substrate and the other end contacts the commutator;
a case fixed to the bracket while covering the top of the bracket; and
a washer fixed to a top inside of the case so as to be interposed between the top inside of the case and top surfaces of the bearings and contacting a part of top areas of the bearings,
wherein the washer is formed in a bar shape of which the length is longer than an outer diameter of the bearing and the width is smaller than the outer diameter of the bearing.

8. The flat type vibration motor structure as set forth in claim 7, wherein the washer is disposed to traverse the top surfaces of the bearings in a diameter direction of the bearing.

9. The flat type vibration motor structure as set forth in claim 8, wherein a top inside of the case is provided with annular protrusions that are protruded toward the top surfaces of the bearings.

10. The flat type vibration motor structure as set forth in claim 8, wherein top edges of the bearings are provided with taper surfaces.

11. The flat type vibration motor structure as set forth in claim 7, wherein the washer is bonded to the top inside of the case.

12. The flat type vibration motor structure as set forth in claim 7, wherein the washer is formed of a PET material.

* * * * *